(12) United States Patent
Sato et al.

(10) Patent No.: US 8,351,597 B2
(45) Date of Patent: Jan. 8, 2013

(54) ELECTRONIC DEVICE, ECHO CANCELING METHOD THEREOF, NON-TRANSITORY COMPUTER READABLE MEDIUM, CIRCUIT SUBSTRATE, AND PORTABLE TELEPHONE TERMINAL DEVICE

(75) Inventors: Yukihiro Sato, Kawsaki (JP); Nobuhiro Mochizuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1191 days.

(21) Appl. No.: 11/860,819

(22) Filed: Sep. 25, 2007

(65) Prior Publication Data

US 2008/0075293 A1   Mar. 27, 2008

(30) Foreign Application Priority Data

Sep. 26, 2006 (JP) ................................ 2006-260196

(51) Int. Cl.
*H04M 1/00* (2006.01)
*H04M 9/00* (2006.01)
*H04M 9/08* (2006.01)
*H03G 3/00* (2006.01)

(52) U.S. Cl. .............. 379/390.01; 379/391; 379/406.01; 381/104; 381/109

(58) Field of Classification Search .................. None
See application file for complete search history.

(56) References Cited

U.S. PATENT DOCUMENTS

| | | | | |
|---|---|---|---|---|
| 5,099,472 A | * | 3/1992 | Townsend et al. | 370/291 |
| 5,692,042 A | * | 11/1997 | Sacca | 379/390.01 |
| 5,771,440 A | * | 6/1998 | Sukhu et al. | 455/63.1 |
| 6,078,793 A | * | 6/2000 | Satyamurti et al. | 455/116 |
| 6,148,078 A | * | 11/2000 | Romesburg | 379/406.07 |
| 6,160,886 A | * | 12/2000 | Romesburg et al. | 379/406.05 |
| 6,185,300 B1 | * | 2/2001 | Romesburg | 379/406.09 |
| 6,297,198 B1 | * | 10/2001 | Lee | 504/271 |
| 6,580,794 B1 | | 6/2003 | Ono | |
| 6,704,415 B1 | * | 3/2004 | Katayama et al. | 379/406.01 |
| 6,901,141 B1 | * | 5/2005 | Sakata et al. | 379/406.01 |
| 2002/0181698 A1 | * | 12/2002 | Takahashi et al. | 379/406.01 |
| 2004/0120510 A1 | * | 6/2004 | LeBlanc | 379/406.01 |
| 2006/0280234 A1 | * | 12/2006 | Gupta | 375/219 |

FOREIGN PATENT DOCUMENTS

| | | |
|---|---|---|
| JP | 62163427 A | 7/1987 |
| JP | 522392 A | 1/1993 |
| JP | 2000-59270 A | 9/2001 |
| JP | 2005-159753 A | 6/2005 |

OTHER PUBLICATIONS

Japanese Office Action dated Aug. 3, 2010, issued in corresponding Japanese Patent Application No. 2006-260196.

* cited by examiner

*Primary Examiner* — Fan Tsang
*Assistant Examiner* — Jeffrey Lytle
(74) *Attorney, Agent, or Firm* — Fujitsu Patent Center

(57) ABSTRACT

The present invention relates to an electronic device that can output received voice and input transmitted voice at the same time and enhances a suppression function for echo due to the received voice sneaking into the transmitted voice. An electronic device (e.g., portable telephone terminal device) outputs the received voice from a voice output unit (speaker), inputs the transmitted voice through a voice input unit (microphone), and includes an echo canceller unit that subtracts a pseudo echo signal for the received voice from the transmitted voice to suppress an echo component in the transmitted voice and a controlling unit that changes an echo suppression amount of the echo canceller unit in accordance with the received voice volume.

27 Claims, 12 Drawing Sheets

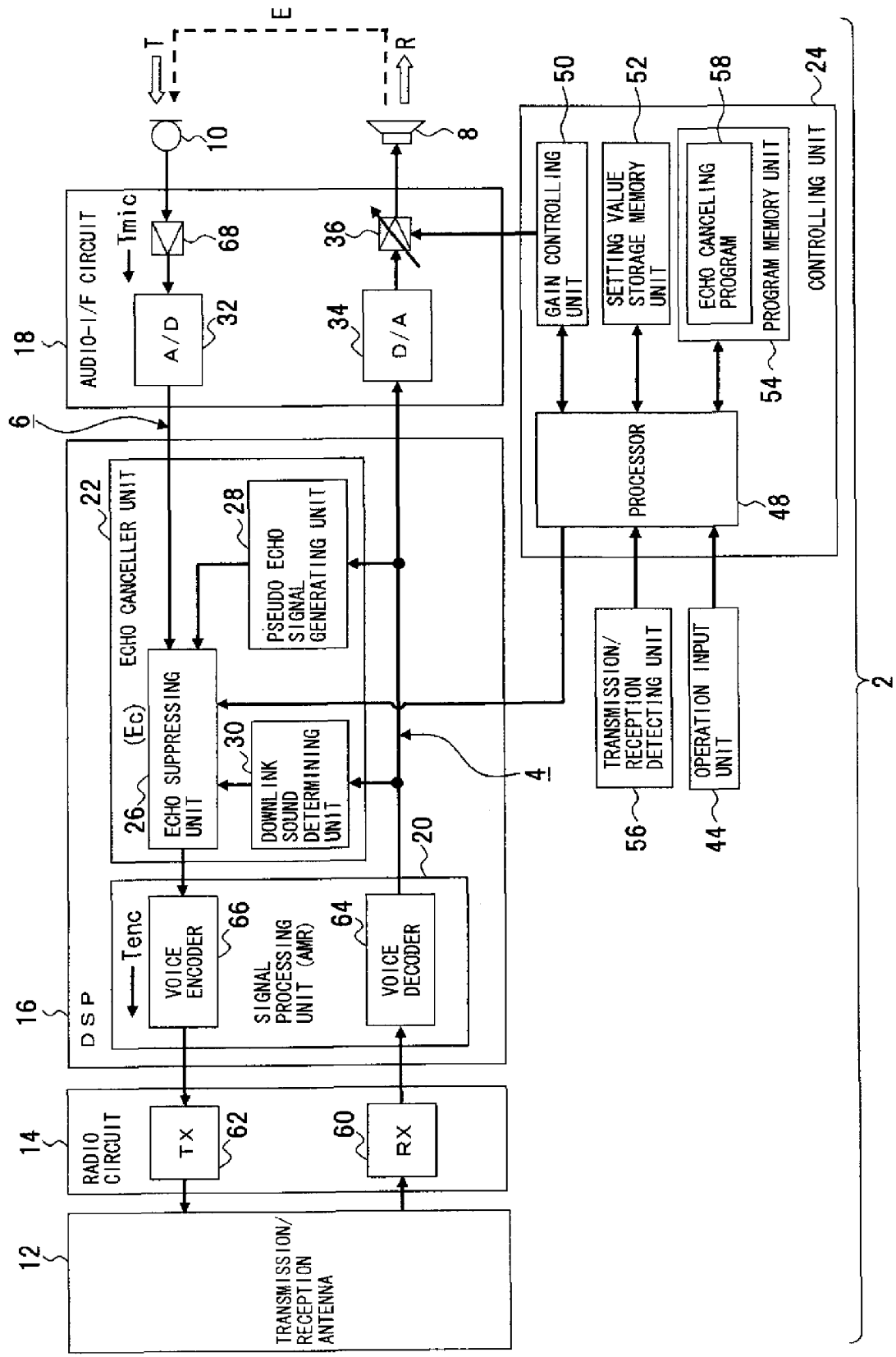

FIG.5A

GAIN SETTING VALUE

| i | R x 1A |
|---|--------|
| ii | R x 2A |
| iii | R x 3A |
| iv | R x 4A |
| v | R x 5A |
| vi | R x 6A |

FIG.5B

ECHO SUPPRESSION AMOUNT

| i | -E x 1A |
|---|---------|
| ii | -E x 2A |
| iii | -E x 3A |
| iv | -E x 4A |
| v | -E x 5A |
| vi | -E x 6A |

52

ELECTRONIC DEVICE, ECHO CANCELING METHOD THEREOF, NON-TRANSITORY COMPUTER READABLE MEDIUM, CIRCUIT SUBSTRATE, AND PORTABLE TELEPHONE TERMINAL DEVICE

CROSS-REFERENCE TO RELATED APPLICATIONS

This application is based upon and claims the benefit of priority from the prior Japanese Patent Application No. 2006-260196, filed on Sep. 26, 2006, the entire contents of which are incorporated herein by reference.

BACKGROUND OF THE INVENTION

1. Field of the Invention

The present invention relates to echo cancellation in an electronic device such as a portable phone enabling handsfree calls and particularly relates to an electronic device that performs echo suppression interlocked with received voice volume, an echo canceling method thereof, an echo canceling program thereof, a recording medium, a circuit substrate, and a portable telephone terminal device.

2. Description of the Related Art

In an electronic device having a short distance between a microphone and a speaker, such as a miniaturized portable phone, output voice (received voice) of the speaker sneaks into the microphone and is transmitted as transmission voice. Especially, in the case of a telephone with a handsfree call function, a large amount of output voice (received voice) of the speaker sneaks into the microphone, and the transmission voice is returned through a telephone of a phone call destination, sneaks into a microphone, and is transmitted again, resulting in echo. Such echo disturbs a voice call through deterioration of intelligibility etc., and makes callers uncomfortable.

With regard to a measure for alleviating the echo due to the received voice sneaking into the transmission voice, Japanese Patent Application Laid-Open Publication No. S62 (1987)-163427 discloses that a pseudo echo signal is generated in response to a received signal (received voice) to subtract the pseudo echo signal from a transmitted signal (transmitted voice), that an echo canceller uses a received signal passing through a level varying means that adjusts the speaker volume, etc. Japanese Patent Application Laid-Open Publication No. H05 (1993)-022392 discloses that surrounding noise is collected and that the surrounding noise signal is used for arithmetically processing and removing a surrounding noise signal included in a transmitted voice signal.

By the way, when echo cancellation is performed with the process disclosed in Japanese Patent Application Laid-Open Publication No. S62(1987)-163427, i.e., by generating a pseudo echo signal in response to a received signal (received voice) to subtract the pseudo echo signal from a transmitted signal (transmitted voice), if the echo canceller capability is low in a telephone of a phone call destination or if the level of the transmitted voice is high, a loop gain exceeds 0 [dB] and howling may be generated due to an echo signal.

Although echo suppression may be performed in accordance with the level of the received voice to suppress generation of the howling, since echo suppression function works in the two-way phone call outputting the received voice and inputting the transmitted voice, the voice arriving at the phone call destination is extremely attenuated, and therefore, it feels difficult to here the voice.

Since enhancement of the echo suppression disturbs the function of the two-way phone call and mitigation of the echo suppression reduces the echo suppression effect, delicate adjustment of parameters is necessary for balancing both enhancement and mitigation. Since the echo amount is fluctuated by the voice volume adjustment on the receiver side, parameters must be adjusted on the basis of the received voice volume. Therefore, the echo must be suppressed without impairing the original phone call function such as two-way phone calls.

In Japanese Patent Application Laid-Open Publication Nos. S62 (1987)-163427 and H05 (1993)-022392, such problems are not disclosed, and a solving means thereof is not disclosed or indicated.

SUMMARY OF THE INVENTION

An object of the present invention relates to an electronic device that can output received voice and input transmitted voice at the same time and is to enhance a suppression function for echo due to the received voice sneaking into the transmitted voice.

Another object of the present invention relates to an electronic device that can output received voice and input transmitted voice at the same time and is to realize the echo suppression in accordance with the received voice.

Yet another object of the present invention relates to an electronic device that can output received voice and input transmitted voice at the same time and is to enhance the echo suppression function and improve the phone call quality.

In order to achieve the above objects, the present invention relates to an electronic device such as a portable telephone terminal device that can output received voice and input transmitted voice at the same time; a pseudo echo signal is generated in response to the received voice; and the pseudo echo signal is subtracted from the transmitted voice to suppress an echo component included in the transmitted voice. This leads to suppression of the received voice sneaking into the transmitted voice. If the echo suppression amount is varied in accordance with the received voice volume, the echo suppression can be performed in accordance with the received voice sneaking into the transmitted voice. As a result, the echo suppression function is enhanced and the phone call quality is improved.

To achieve the above objects, according to a first aspect of the present invention there is provided an electronic device outputting received voice from a voice output unit and inputting transmitted voice through a voice input unit, comprising an echo canceller unit that subtracts a pseudo echo signal for the received voice from the transmitted voice to suppress an echo component in the transmitted voice; and a controlling unit that changes an echo suppression amount of the echo canceller unit in accordance with received voice volume.

To achieve the above objects, in the electronic device, the echo canceller unit may include a pseudo echo signal generating unit that generates the pseudo echo signal, and a suppressing unit that subtracts the pseudo echo signal generated by the pseudo echo signal generating unit from the transmitted voice to suppress the echo component in the transmitted voice. The electronic device may comprise a determining unit that determines whether the received voice exists, the electronic device causing the suppressing unit to execute the suppression operation if the received voice exists. The electronic device may comprise a level adjusting unit that adjusts a level of the received voice volume, the electronic device setting an echo suppression amount of the suppressing unit in accordance with a setting value set in the level adjusting unit.

The electronic device may comprise a processor that controls an echo suppression amount of the suppressing unit based on volume level information of the received voice. The electronic device may comprise a switching unit that gradually switches a level of the received voice and/or a suppression level of the transmitted voice. In the electronic device, the switching unit may be a mechanical switch.

To achieve the above objects, according to a second aspect of the present invention there is provided an echo canceling method of an electronic device outputting received voice from a voice output unit and inputting transmitted voice through a voice input unit, the method comprising the steps of subtracting a pseudo echo signal from the transmitted voice to suppress an echo component in the transmitted voice; and changing an echo suppression amount for the transmitted voice in accordance with received voice volume.

To achieve the above objects, the echo canceling method of an electronic device may comprise the steps of determining whether the received voice exists; and suppressing the transmitted voice if the received voice exists The echo canceling method of an electronic device may comprise the steps of adjusting a level of the received voice volume; and setting an echo suppression amount for the transmitted voice in accordance with the level of the received voice volume. The echo canceling method of an electronic device may comprise the step of gradually switching a level of the received voice and/or a suppression level of the transmitted voice.

To achieve the above objects, according to a third aspect of the present invention there is provided an echo canceling program of an electronic device, the program being executed by a computer, the program comprising the steps of subtracting a pseudo echo signal from the transmitted voice to suppress an echo component in the transmitted voice; and changing an echo suppression amount for the transmitted voice in accordance with received voice volume.

To achieve the above objects, the echo canceling program of an electronic device may comprise the steps of determining whether a received voice exists; and suppressing the transmitted voice if the received voice exists. The echo canceling program of an electronic device may comprise the steps of adjusting a level of the received voice volume; and setting an echo suppression amount for the transmitted voice in accordance with the level of the received voice volume. The echo canceling program of an electronic device may comprise the step of gradually switching a level of the received voice and/or a suppression level of the transmitted voice.

To achieve the above objects, according to a fourth aspect of the present invention there is provided a computer readable recording medium having stored thereon an echo canceling program of an electronic device, the program being operable to drive a computer to execute the steps of subtracting a pseudo echo signal from the transmitted voice to suppress an echo component in the transmitted voice; and changing an echo suppression amount for the transmitted voice in accordance with received voice volume.

To achieve the above objects, in the computer readable recording medium storing an echo canceling program of an electronic device, the echo canceling program of an electronic device may cause execution of the steps of determining whether a received voice exists; and suppressing the transmitted voice if the received voice exists. The echo canceling program of an electronic device may cause execution of the steps of adjusting a level of the received voice volume; and setting an echo suppression amount for the transmitted voice in accordance with the level of the received voice volume. The echo canceling program of an electronic device may cause execution of the step of gradually switching a level of the received voice and/or a suppression level of the transmitted voice.

To achieve the above objects, according to a fifth aspect of the present invention there is provided a circuit substrate for use in an electronic device outputting received voice from a voice output unit and inputting transmitted voice through a voice input unit, comprising an echo canceller unit that subtracts a pseudo echo signal for the received voice from the transmitted voice to suppress an echo component in the transmitted voice; and a controlling unit that changes an echo suppression amount of the echo canceller unit in accordance with received voice volume.

To achieve the above objects, in the circuit substrate, the echo canceller unit may include a pseudo echo signal generating unit that generates the pseudo echo signal, and a suppressing unit that subtracts the pseudo echo signal generated by the pseudo echo signal generating unit from the transmitted voice to suppress the echo component in the transmitted voice. The circuit substrate may comprise a determining unit that determines whether the received voice exists, the circuit substrate causing the suppressing unit to execute the suppression operation if the received voice exists. The circuit substrate may comprise a level adjusting unit that adjusts a level of the received voice volume, the circuit substrate setting an echo suppression amount of the suppressing unit in accordance with a setting value set in the level adjusting unit. The circuit substrate may comprise a processor that controls an echo suppression amount of the suppressing unit based on volume level information of the received voice. The circuit substrate may comprise a switching unit that gradually switches a level of the received voice and/or a suppression level of the transmitted voice. In the circuit substrate, the switching unit may be a mechanical switch.

To achieve the above objects, according to a sixth aspect of the present invention there is provided a portable telephone terminal device outputting received voice from a voice output unit and inputting transmitted voice through a voice input unit, comprising an echo canceller unit that subtracts a pseudo echo signal for the received voice from the transmitted voice to suppress an echo component in the transmitted voice; and a controlling unit that changes an echo suppression amount of the echo canceller unit in accordance with received voice volume.

To achieve the above objects, in the portable telephone terminal device, the echo canceller unit may include a pseudo echo signal generating unit that generates the pseudo echo signal, and a suppressing unit that subtracts the pseudo echo signal generated by the pseudo echo signal generating unit from the transmitted voice to suppress the echo component in the transmitted voice. The portable telephone terminal device may comprise a determining unit that determines whether the received voice exists, the portable telephone terminal causing the suppressing unit to execute the suppression operation if the received voice exists. The portable telephone terminal device may comprise a level adjusting unit that adjusts a level of the received voice volume, the portable telephone terminal setting an echo suppression amount of the suppressing unit in accordance with a setting value set in the level adjusting unit. The portable telephone terminal device may comprise a processor that controls an echo suppression amount of the suppressing unit based on volume level information of the received voice.

The features and advantages of the present invention are listed as follows.

(1) Sneaking of received voice into transmitted voice can be suppressed to enhance a suppression function for echo.

(2) Since echo suppression is performed with an echo suppression amount corresponding to the received voice, echo suppression accuracy can be enhanced.

(3) Since the echo suppression function is improved, intelligibility of the received voice can be enhanced and the phone call quality can be improved.

Other objects, features, and advantages of the present invention will become more apparent by reference to the accompanying drawings and embodiments.

BRIEF DESCRIPTION OF THE DRAWINGS

FIG. 4 depicts a configuration example of a portable telephone terminal device according to a second embodiment;

FIGS. 5A and 5B depict examples of gain setting values stored in a setting value storage memory unit and echo suppression amounts;

DETAILED DESCRIPTION OF THE PREFERRED EMBODIMENTS

First Embodiment

Figure 1:
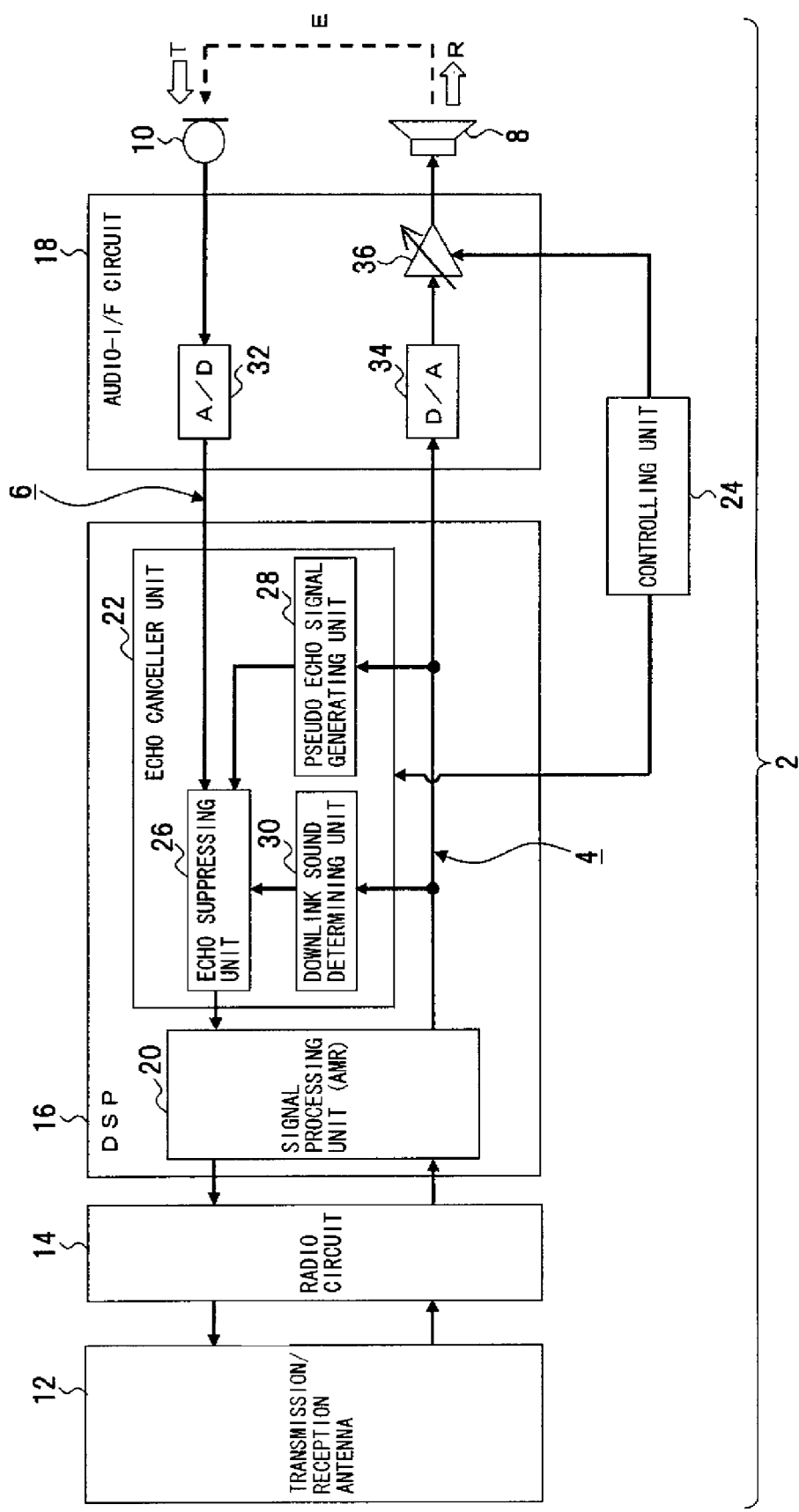
FIG. 1 depicts a configuration example of a portable telephone terminal device according to a first embodiment.

A first embodiment of the present invention will be described with reference to FIG. 1. FIG. 1 depicts a configuration example of a portable telephone terminal device according to a first embodiment.

A portable telephone terminal device 2 is an example of an electronic device outputting received voice (downlink signal) R from a voice output unit and inputting transmitted voice (uplink signal) T through a voice input unit as a phone call function. To achieve such phone call function, the portable telephone terminal device 2 is disposed with both a reception system (downlink system) 4 and a transmission system (uplink system) 6; the reception system 4 converts a received radio signal into a voice signal and outputs the voice signal as the received voice from a speaker 8, which is the voice output unit; and the transmission system 6 converts a transmitted voice input to a microphone 10, which is the voice input unit, into a radio signal and transmits the radio signal. In this case, echo E is voice sneaking into the microphone 10 from the received voice R output from the speaker 8.

The reception system 4 and the transmission system 6 are disposed with a transmission/reception antenna 12, a radio circuit 14, a digital signal processing unit (DSP, Digital Signal Processor) 16 that is a first voice signal processing unit, and an audio interface (Audio-I/F) circuit is that is a second voice signal processing unit.

The radio circuit 14 demodulates the radio signal received by the antenna 12 into the voice signal and inputs the voice signal to the DSP 16 in the reception system 4 and modulates and converts the voice signal from the DSP 16 into a high-frequency radio signal and outputs the high-frequency radio signal to the antenna 12 in the transmission system 6.

The DSP 16 reproduces the received voice signal from the received signal demodulated by the radio circuit 14, encodes the transmitted voice signal, and performs digital processes for signal processes such as suppression of an echo component included in the transmitted voice signal. The DSP 16 includes a signal processing unit 20 that performs a signal decoding process, encoding process, etc., and an echo canceller unit 22 that performs processes such as the echo suppression. A controlling unit 24 is disposed between the echo canceller unit 22 and the Audio-I/F circuit 18 to increase and decrease the echo suppression amount in accordance with the level of the received voice and to perform other processes.

The signal processing unit 20 is configured by, e.g., an AMR (Advanced Multi Rate CODEC), can flexibly change a transfer route depending on types and conditions of lines, and performs signal processes in this embodiment, such as a decoding process of the received voice from the received signal demodulated by the radio circuit 14 and an encoding process of the transmitted signal for converting the transmitted voice signal after the echo suppression into the transmitted signal to output the transmitted signal to the radio circuit 14.

The echo canceller unit 22 includes an echo suppressing unit 26, a pseudo echo signal generating unit 28, and a downlink sound determining unit 30. The echo suppressing unit 26 responds to the determination output of the downlink sound determining unit 30, i.e., the received voice, and subtracts a pseudo echo signal from the transmitted voice signal to suppress the echo component included in the transmitted voice through the digital signal process. The pseudo echo signal generating unit 28 receives the received voice from the reception system 4 and generates the pseudo echo signal in response to this received voice. The downlink sound determining unit 30 receives the input signal from the reception system 4, determines whether the received voice has sound, and outputs the determination output to the echo suppressing unit 26. The echo suppressing unit 26 responds to the output of the downlink sound determining unit 30 to execute the echo suppression operation.

The Audio-I/F circuit 18 includes an analog-digital converter (A/D) 32 in the transmission system 6, a digital-analog converter (D/A) 34 in the reception system 4, and a variable gain amplifier 36 that is a reception volume circuit. The A/D 32 converts transmitted voice of an analog signal input from the microphone 10 into a digital signal and inputs the digital signal into the DSP 16. The D/A 34 converts a digital signal output from the DSP 16 into received voice of an analog signal. The variable gain amplifier 36 is a level adjusting unit that adjusts the level of the received voice volume and is configured by, e.g., a differential circuit to adjust the output level of the received voice signal. The volume level of the speaker 8 is dependent on the gain setting value of the variable gain amplifier 36.

The controlling unit 24 is configured by a computer, etc., to set, e.g., gradual gains in the variable gain amplifier 36 and outputs the echo suppression amount corresponding to the gain setting value to set the echo suppression amount in the echo canceller unit 22. That is, the echo suppression amount set in the echo suppressing unit 26 of the echo canceller unit 22 corresponds to the received voice and can be changed in accordance with the received voice volume.

Figure 2:
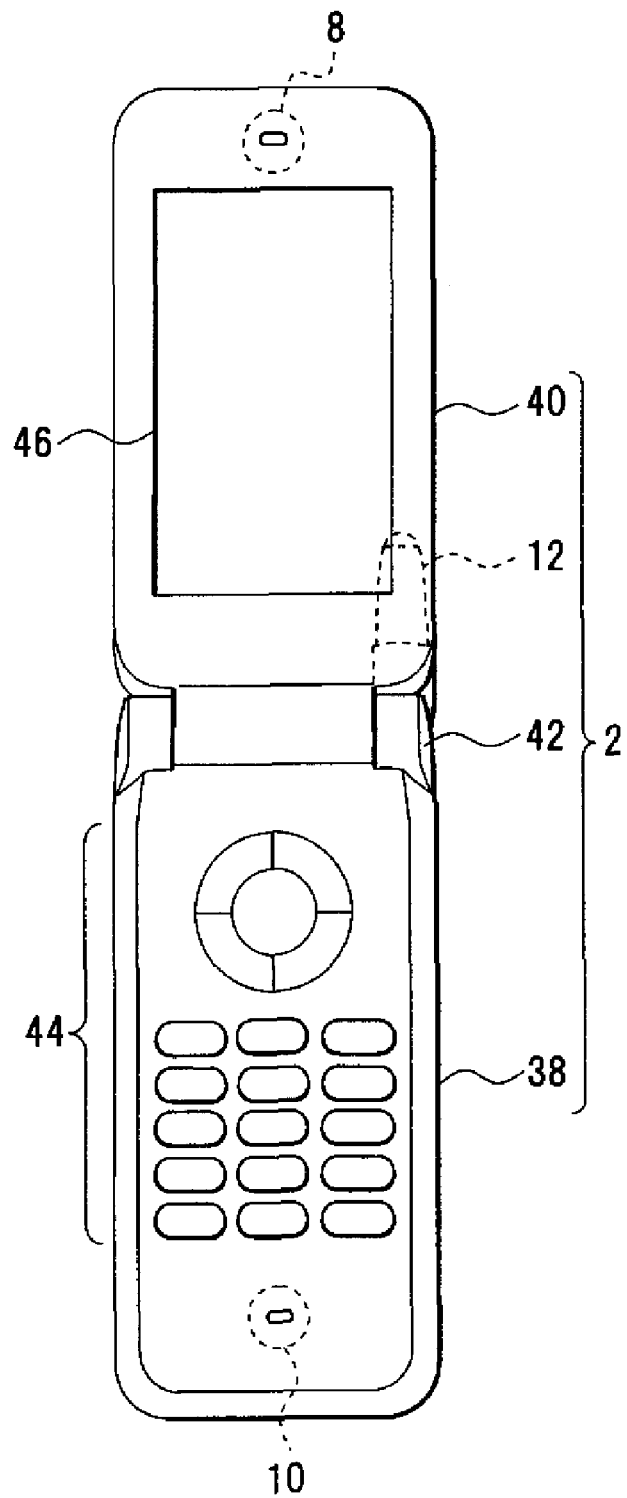
FIG. 2 depicts a configuration example of a portable telephone terminal device.

The portable telephone terminal device 2 will be described with reference to FIG. 2. FIG. 2 depicts a specific configuration example of the portable telephone terminal device 2. In FIG. 2, the same reference numerals are added to the same portions as FIG. 1.

This portable telephone terminal device 2 includes first and second housings 38, 40 and is configured in an openable/closable manner by coupling the housings 38, 40 with a hinge unit 42; the housing 38 is disposed with the above microphone 10, the transmission/reception antenna 12, an operation input unit 44 including a plurality of keys, etc.; and the housing 40 is disposed with the above speaker 8 and a displaying unit 46. The operation input unit 44 is used for entering telephone numbers, etc., and for setting or switching the gain of the variable gain amplifier 36. The operation input unit 44 configures a gain setting unit in the case of setting the gain and configures a gain switching unit in the case of switching the gain.

The speaker 8 and the microphone 10 are proximally disposed by the housings 38, 40 mechanically coupled by the hinge unit 42, and the received voice output from the speaker 8 sneaks into the microphone 10 through the housings 38, 40, the user's head, or the atmosphere.

Figure 3:
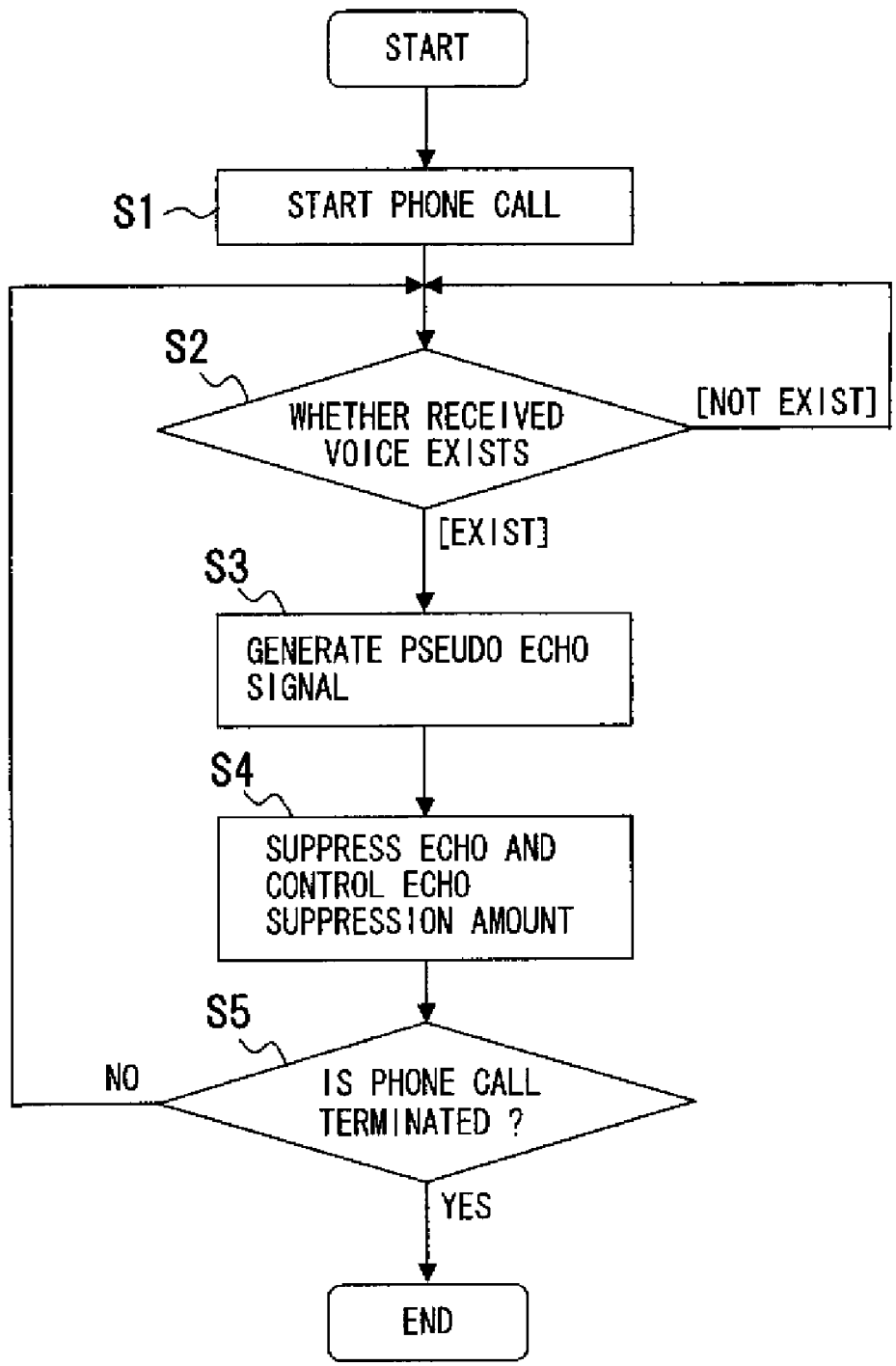
FIG. 3 is a flowchart of an example of a process procedure of an echo canceling method.

An echo canceling method of the portable telephone terminal device 2 will be described with reference to FIG. 3. FIG. 3 is a flowchart of a process procedure of the echo canceling method.

In this echo canceling method, the echo canceling operation is performed at the start of a phone call (step S1) to determine whether the received voice exists (step S2). If the received voice exists, the pseudo echo signal is generated in response to the received voice (step S3), and the echo suppression process and the echo suppression amount corresponding to the received voice volume are controlled for the echo component included in the transmitted voice (step S4). It is determined whether the phone call is terminated (step S5); the echo canceling operation is continued as long as the phone call is continued; and when the phone call is terminated, the echo canceling function is halted.

The processes included in the echo canceling method will be listed and described.

a) Generation of Pseudo Echo Signal

Due to the start of the phone call and/or the presence of the received voice, the pseudo echo signal generating unit 28 generates the pseudo echo signal. In the embodiment of FIG. 1, the pseudo echo signal is a digital signal and is correlated with the voice signal of the received voice sneaking into the transmission system 6.

b) Echo Suppressing Process

The echo suppressing process is a process of subtracting the pseudo echo signal from the transmitted voice signal to suppress the echo component included in the transmitted voice.

c) Increase and Decrease of Echo Suppression Amount

If the received voice amount output from the speaker 8 fluctuates, the echo amount sneaking into the microphone 10 also changes. Since the echo amount is dependent on the fluctuations of the received voice, the echo suppression amount is increased and decreased in accordance with the received voice volume. In such a process, the echo suppression can be reduced when the level of the received voice volume is low and the echo suppression can be increased when the level of the received voice volume is high, which enables the echo suppression suitable for the received voice volume.

d) Termination of Echo Canceling Function

Since the echo cancellation may be performed only during the phone call period, it is monitored whether the phone call exists, and the echo canceling function is terminated based on the termination of the phone call.

Describing the operation of the portable telephone terminal device 2 shown in FIGS. 1 and 2 with regard to the above processes, the downlink sound determining unit 30 in the echo canceller unit 22 of the DSP 16 performs the sound determination for the received voice R, and based on the determination result, the echo canceller unit 22 performs the signal process of the echo suppression for the transmitted voice T, which is transmitted to the other party.

Since the Audio-I/F circuit 18 is disposed with the variable gain amplifier 36 that is the reception volume circuit, the volume of the received voice R output from the speaker 8 fluctuates and, therefore, the echo amount sneaking into the microphone 10 is changed. To drive the echo suppressing unit 26 to follow the fluctuations of the volume level of the received voice R, if the controlling unit 24 comprehends the received voice volume and the echo canceller unit 22 of the DSP 16 is notified of the volume information to set the echo suppression amount in accordance with the received voice volume, the echo suppression suitable for the volume of the received voice R can be performed. If the received voice volume is small, the echo suppression can be reduced, and if the received voice volume is large, the echo suppression can be increased.

Since linear volume fluctuations are often generated by a few decibel steps if the variable gain amplifier 36 is configured by a digital electronic volume circuit, if the volume fluctuations or information of such fluctuations is used, the echo suppression following the received voice volume can be realized simply by adding the similar linear echo suppression amounts to the transmitted voice T.

Second Embodiment

A second embodiment of the present invention will be described with reference to FIG. 4. FIG. 4 depicts a portable telephone terminal device. In FIG. 4, the same reference numerals are added to the portions same as or in common with FIG. 1.

The portable telephone terminal device 2 (FIG. 4) according to the second embodiment has a configuration equivalent to the portable telephone terminal device 2 shown in FIG. 1, and the controlling unit 24 includes a processor 48, a gain controlling unit 50, a setting value storage memory unit 52, and a program memory unit 54 and is connected to a transmission/reception detecting unit 56 to control the echo suppression amount in accordance with the volume level of the received voice R. Although the transmission/reception detecting unit 56 is disposed outside the controlling unit 24 in this case, the transmission/reception detecting unit 56 may be disposed within the controlling unit 24.

The processor 48 is configured by a microcomputer, a CPU (Central Processing Unit) disposed in the portable telephone terminal device 2, etc., and executes an echo canceling program 58 stored in the program memory unit 54 to read or write data of the setting value storage memory unit 52 and to control the echo suppression amount of the echo suppressing unit 26 and the gain controlling unit 50.

The gain controlling unit 50 is configured by a register, etc., sets an amplification gain to the variable gain amplifier 36 in accordance with the input from the operation input unit 44 or a gain setting value (R×nA) read by the processor 48 from the setting value storage memory unit 52, and stores the setting value. The gain setting value of the variable gain amplifier 36 is read by the processor 48 through the gain controlling unit 50 and is stored in the setting value storage memory unit 52.

The setting value storage memory unit 52 stores the gain setting values (R×nA, where n=1, 2, . . . 6) and the echo suppression amounts (−E×nA, where n=1, 2, . . . 6) corresponding to the gain setting values. In this case, FIG. 5A shows a table of the gain setting values (R×nA, where n=1, 2, . . . 6) stored in the setting value storage memory unit 52, and FIG. 5B shows a table of the echo suppression amounts (−E×nA, where n=1, 2, . . . 6) stored in the setting value storage memory unit 52. Common numbers of the setting values represent correlation relationships between the gain setting values and the echo suppression amounts. That is, if the gain setting value "R×3A" is set, the echo suppression amount is set to "−E×3A".

The program memory unit 54 stores the echo canceling program 58, etc., and the echo canceling program 58 is a program that drives the processor 48 to perform control necessary for executing the above echo canceling method and includes the canceling process (arithmetic control) of the echo component, increase/decrease control of the echo suppression amount depending on the level of the received voice, etc.

The transmission/reception detecting unit 56 detects transmission or reception based on an outgoing signal in the case of transmission and an incoming signal in the case of reception. The detection signal is input to the processor 48 and is used for starting the echo canceling operation.

The radio circuit 14 is disposed with a receiving unit (RX) 60 that receives the radio signal through the antenna 12 in the reception system 4 and a transmitting unit (TX) 62 that transmits the radio signal through the antenna 12 in the transmission system 6.

The signal processing unit 20 of the DSP 16 is disposed with a voice decoder 64 that decodes the received voice signal in the reception system 4 and a voice encoder 66 that encodes the transmitted voice signal in the transmission system 6. On the side of the transmission system 6 of the Audio-I/F circuit is, an amplifier 68 is disposed for amplifying the transmitted signal on the stage before conversion into a digital signal.

Other constituent elements are the same as the first embodiment and the description thereof will be omitted by adding the same reference numerals.

In the configuration of the portable telephone terminal device 2 (FIG. 4) according to the second embodiment, as is the case with the first embodiment, the echo component in the transmitted voice can be suppressed by subtracting the pseudo echo signal from the transmitted voice signal. Since the suppression of the echo component is performed based on the sound determination of the received voice and the echo suppression amount for suppressing the echo component in the transmitted voice is dependent on the level of the received voice, only the echo component in the transmitted voice is suppressed. As a result, the intelligibility of the received voice can be enhanced and the two-way call quality can be improved without attenuating the transmitted voice.

Figure 6:
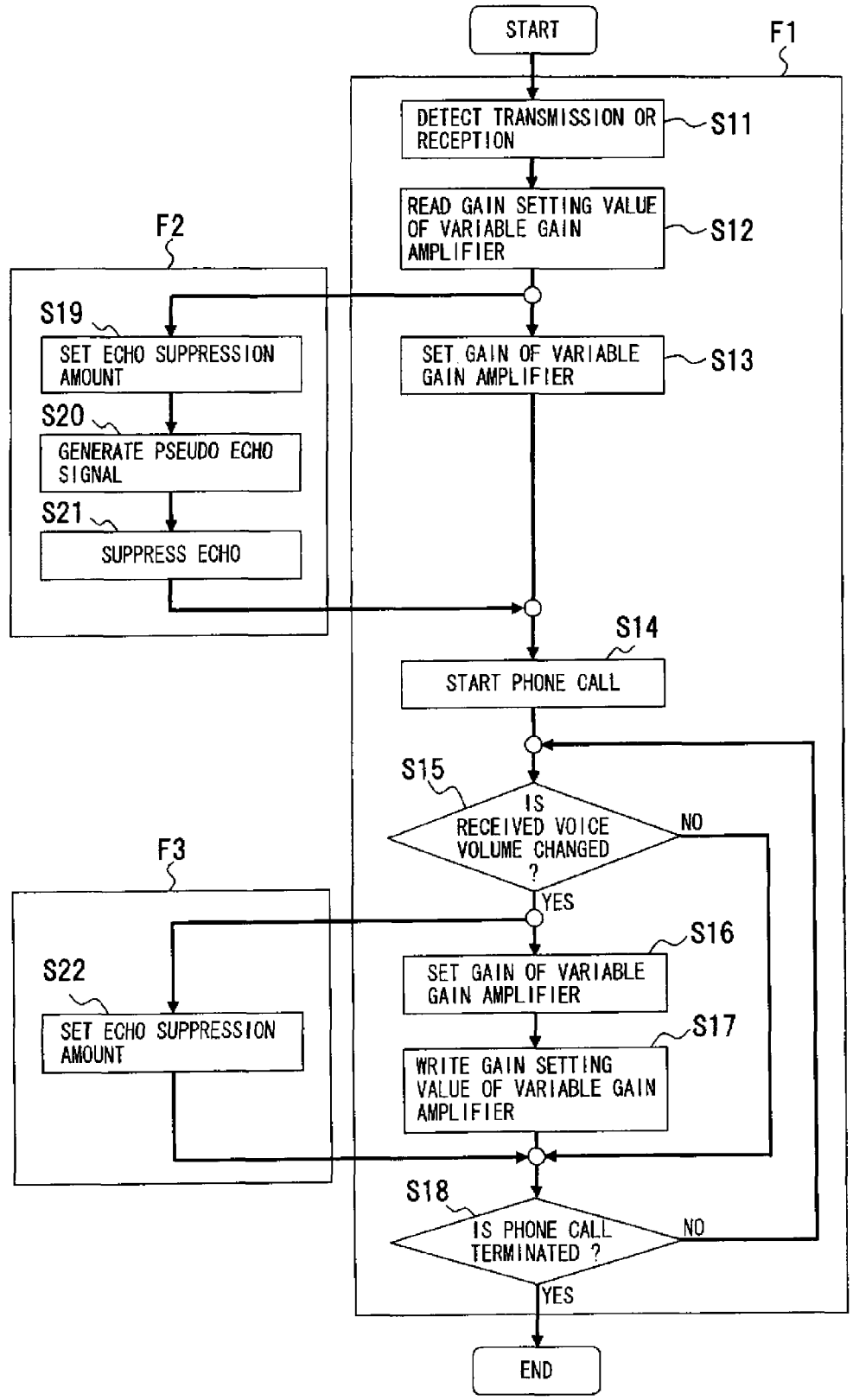
FIG. 6 is a flowchart of an example of a process procedure of an echo canceling method and echo canceling program.

The echo canceling method and the echo canceling program will be described with reference to FIG. 6. FIG. 6 is a flowchart of a process procedure of the echo canceling method and echo canceling program.

The process procedure of the portable telephone terminal device 2 includes a process F1 of the reception system 4 and processes F2, F3 of the echo canceller unit 22. In the process F1, the gain of the variable gain amplifier 36 during a phone call is set and the reception voice volume is monitored based on the transmission and reception. The process F2 is a process working with the process F1; the echo suppression amount corresponding to the gain setting is set; the pseudo echo signal is generated; and the echo canceling process is performed. The process F3 is also a process working with the process F1, and the echo suppression amount is set in association with changes in the received voice volume.

In process F1, when powered on, the procedure goes to a standby state to detect transmission or reception (step S11). Based on the detection of transmission or reception, a gain setting value of the variable gain amplifier 36 is read from the setting value storage memory unit 52 (step S12), and the gain setting value is set in the variable gain amplifier 36 (step S13).

A phone call is started (step S14); it is checked whether the received voice volume is changed (step S15); if the volume is changed, the gain of the variable gain amplifier 36 is set (step S16); and the gain setting value set in the variable gain amplifier 36 is written and stored into the setting value storage memory unit 52 (step S17).

It is determined whether the phone call is terminated (step S18) and if the phone call is terminated, the echo canceling process is also terminated. As long as the phone call is continued, the process of steps S15 to S18 is repeatedly executed, and if the received voice volume is not changed at step S15, steps S16 and S17 are skipped and the procedure goes to step S18.

In the process F2, the echo suppression amount is set (step S19) in conjunction with reading of the gain setting value of the variable gain amplifier 36 from the setting value storage memory unit 52 (step S12), and the pseudo echo signal is generated in response to the received voice (step S20) to perform the echo suppression (step S21). In the echo suppression, the pseudo echo signal is subtracted from the transmitted voice to suppress the echo component in the transmitted voice.

In the process F3, the echo suppression amount is set based on the change in the received voice volume (step S22). The echo suppression is performed based on this setting of the echo suppression amount.

The echo suppression process is as follows.

An echo amount E sneaking into the microphone 10 from the received voice can be expressed by the following equations (1) and (2):

$$E(t) = XnAR(t) \qquad (1)$$

$$E(t-t0) = XnAR(t-t0) \qquad (2)$$

where t is time; t0 is delay time; X is sneaking coefficient; nA is gain coefficient and echo suppression coefficient (n=1, . . . 6) dependent on the received voice volume; and R is received voice volume.

An echo suppression amount Ec to be suppressed by the echo suppressing unit 26 of the DSP 16 is expressed by the following equation (3).

$$\begin{aligned} Ec(t) &= -E(t-t0) \\ &= -XnAR(t-t0) \end{aligned} \qquad (3)$$

Assuming for transmitted voice T that transmitted voice collected by the microphone 10 is Tmic and that transmitted voice actually encoded is Tenc, the transmitted voice Tmic, Tenc can be expressed by the following equations (4) and (5).

$$Tmic(t) = T(t) + E(t - t0) \tag{4}$$

$$\begin{aligned} Tenc(t) &= Tmic(t) + Ec \\ &= T(t) + E(t - t0) - E(t - t0) \\ &= T(t) \end{aligned} \tag{5}$$

Such an arithmetic process, i.e., the echo suppression is performed by subtracting the echo component included in the transmitted voice Tmic, and the transmission voice Tenc after the echo suppression is encoded and transmitted to the other party.

Third Embodiment

Figure 7:
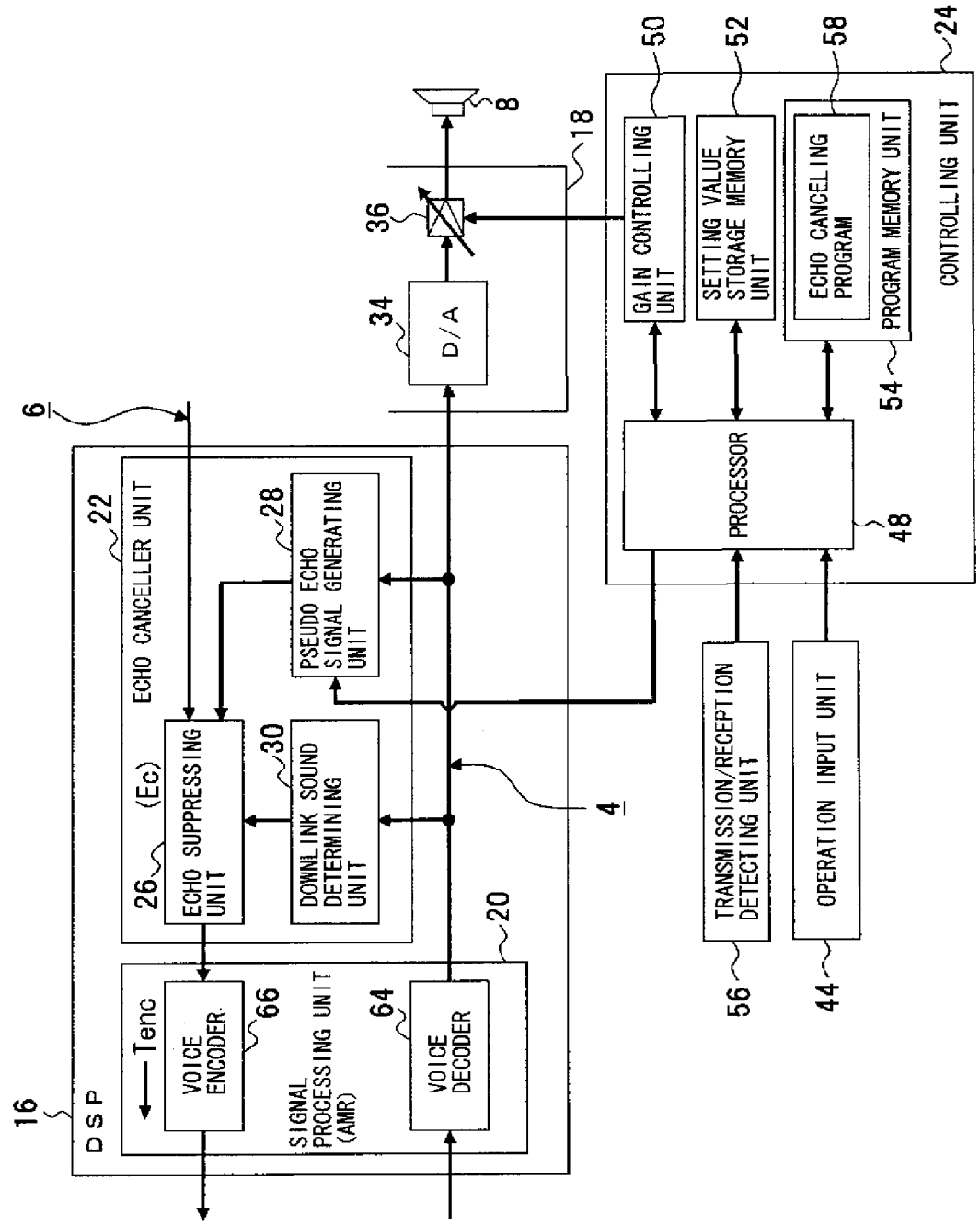
FIG. 7 depicts a configuration example of a portable telephone terminal device according to a third embodiment.

A third embodiment of the present invention will be described with reference to FIG. 7. FIG. 7 depicts a portable telephone terminal device. In FIG. 7, the same reference numerals are added to the portions same as or in common with FIGS. 1 and 4.

Although the echo suppression amount of the echo suppressing unit 26 is controlled correspondingly to the amplification gain set in the variable gain amplifier 36 in the second embodiment, the processor 48 of the controlling unit 24 may supply the pseudo echo signal generating unit 28 with the control output corresponding to the setting gain to control the pseudo echo signal level in the third embodiment as shown in FIG. 7. In such a configuration, the level of the pseudo echo signal applied to the echo suppressing unit 26 is increased or decreased to control the echo suppression amount.

Fourth Embodiment

Figure 8:
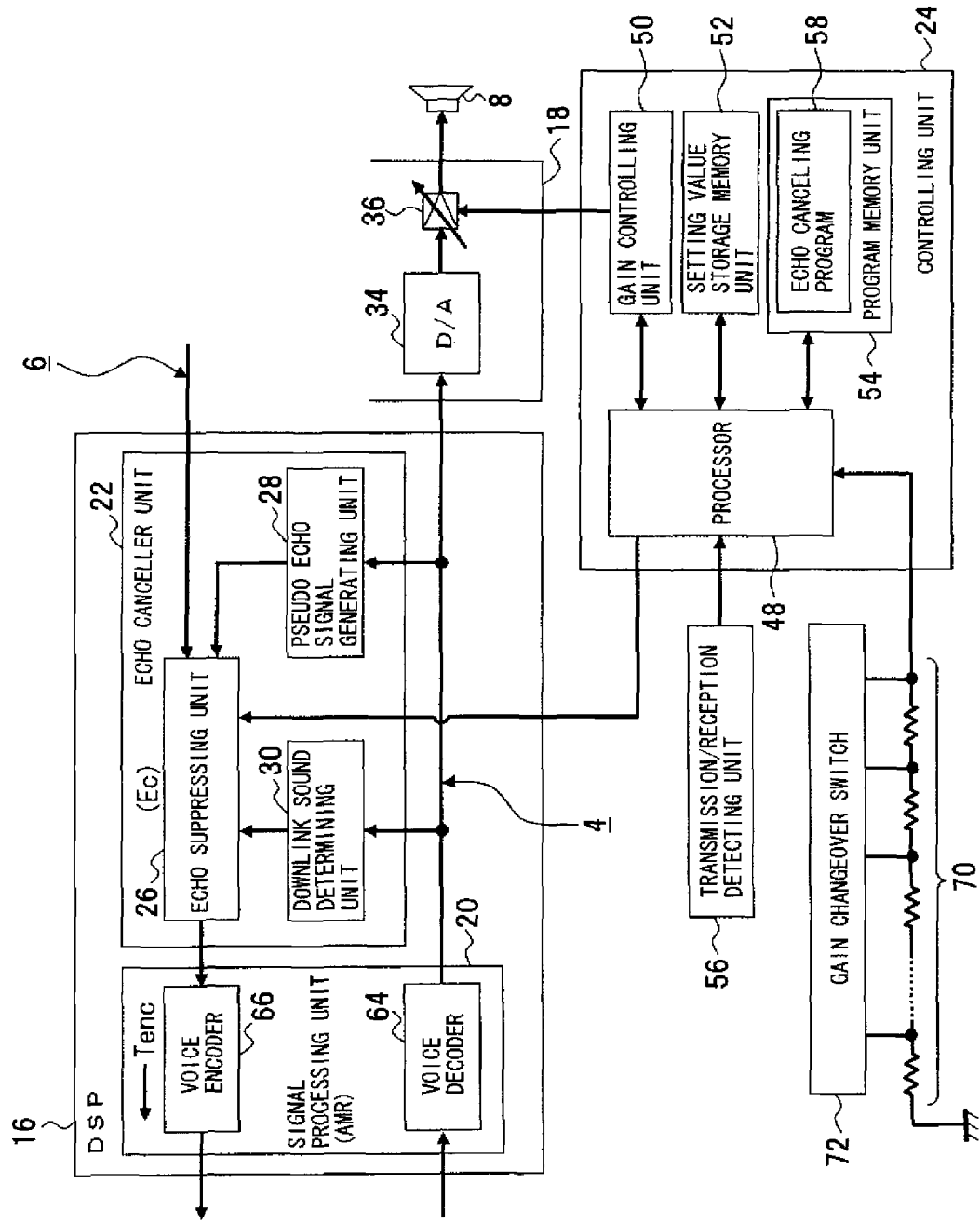
FIG. 8 depicts a configuration example of a portable telephone terminal device according to a fourth embodiment.

A fourth embodiment of the present invention will be described with reference to FIG. 8. FIG. 8 depicts a portable telephone terminal device. In FIG. 8, the same reference numerals are added to the portions same as or in common with FIGS. 1 and 4.

Although the gain is set and switched with the operation input unit 44 in the second embodiment, a variable resistance 70 and a gain changeover switch 72 may be disposed as a switching unit that gradually switches the level of the received voice and/or the suppression level of the transmission voice as shown in FIG. 8, and the gain changeover switch 72 may switch the resistance value of the variable resistance 70 to enable the gradual gain switching in accordance with the switching of the resistance value. In such a configuration, the similar effect can be expected. The gain changeover switch 72 may be an electronic switch or a mechanical switch.

Fifth Embodiment

Figure 9:
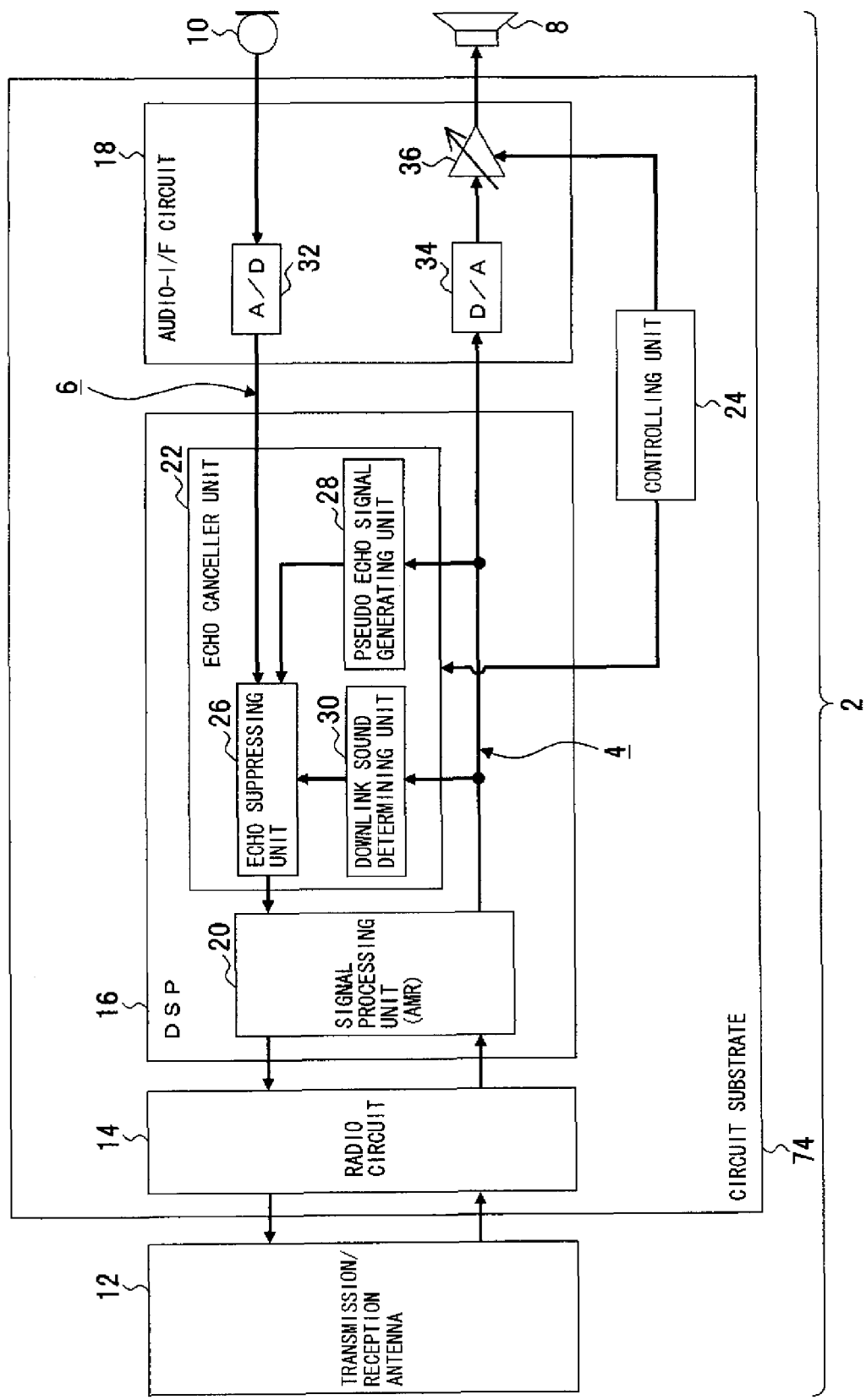
FIG. 9 depicts a configuration example of a circuit substrate used in a portable telephone terminal device according to a fifth embodiment.

A fifth embodiment of the present invention will be described with reference to FIG. 9. FIG. 9 depicts a circuit substrate used for an electronic device such as a portable telephone terminal device. In FIG. 9, the same reference numerals are added to the same portions as FIG. 1.

This circuit substrate 74 is disposed with functional circuit units, which are the radio circuit 14, the DSP 16, the Audio-I/F circuit 18, and the controlling unit 24 along with wiring conductors configuring the above reception system 4 and the transmission system 6. The DSP 16 includes the signal processing unit 20 and the echo canceller unit 22. The circuit substrate 74 may be configured by a printed wiring substrate or an IC (Integrated Circuit) substrate.

The radio circuit 14, the DSP 16, the Audio-I/F circuit 18, and the controlling unit 24 may be configured by IC or discrete parts other than IC.

The controlling unit 24 may be disposed outside the circuit substrate 74 and may be configured by a computer of the portable telephone terminal device 2 having the circuit substrate 74 mounted thereon.

This circuit substrate 74 is used in the portable telephone terminal device 2 and can suppress the echo component sneaking into the transmission voice T to enhance intelligibility of the received voice to the other party and to contribute to quality improvement of the two-way call.

Although the circuit substrate 74 is mounted on the portable telephone terminal device 2 in this embodiment, the circuit substrate 74 may be mounted on other electronic devices to achieve the communication function in those electronic devices.

Sixth Embodiment

Figure 10:
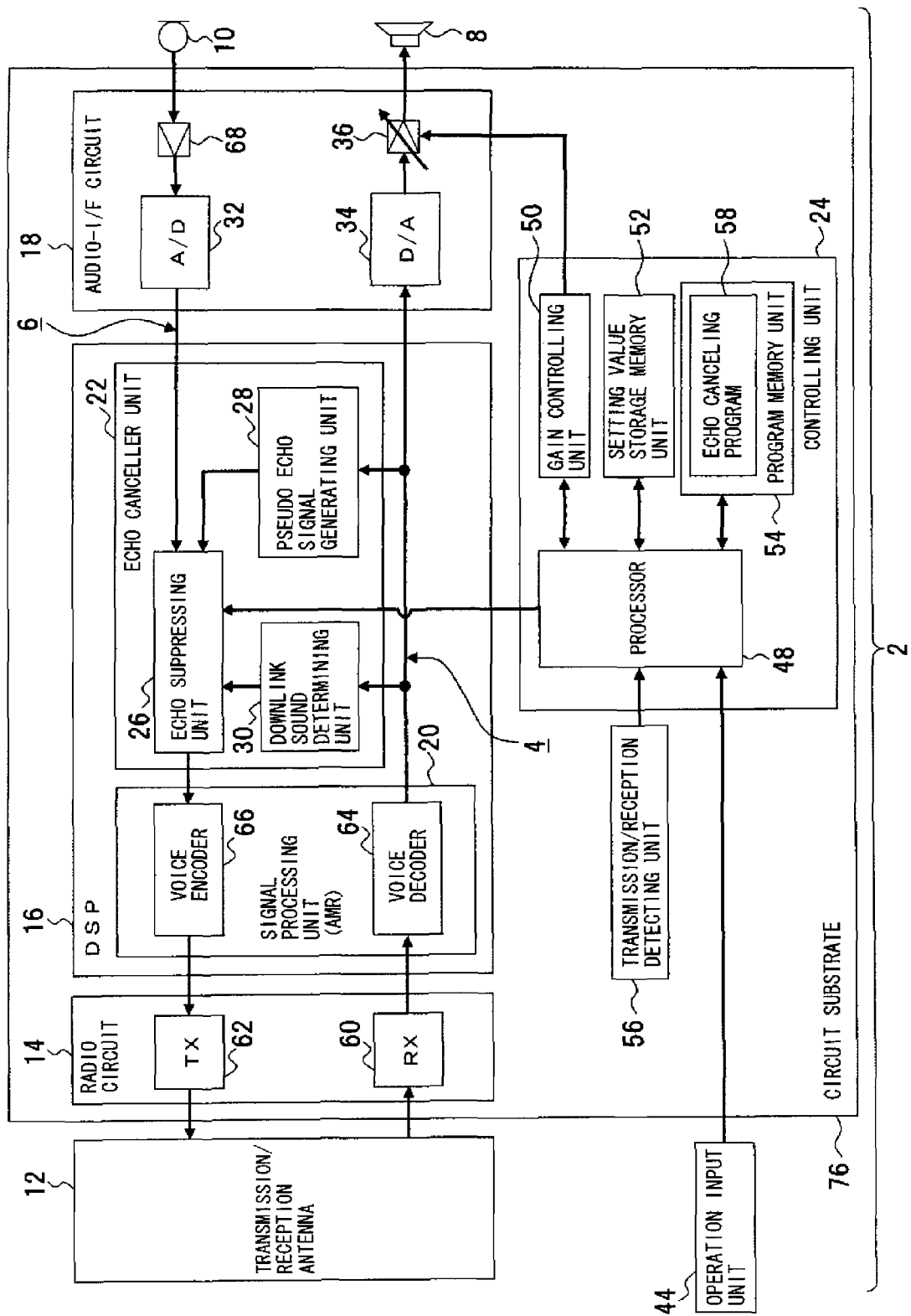
FIG. 10 depicts a configuration example of a circuit substrate used in a portable telephone terminal device according to a sixth embodiment.

A sixth embodiment of the present invention will be described with reference to FIG. 10. FIG. 10 depicts a circuit substrate used for an electronic device such as a portable telephone terminal device. In FIG. 10, the same reference numerals are added to the same portions as FIG. 1.

This circuit substrate 76 according to the sixth embodiment is disposed with functional circuit units, which are the radio circuit 14, the DSP 16, the Audio-I/F circuit 18, the controlling unit 24, and the transmission/reception detecting unit 56 along with wiring conductors configuring the above reception system 4 and the transmission system 6. The DSP 16 also includes the signal processing unit 20 and the echo canceller unit 22. In this case, the circuit substrate 76 may also be configured by a printed wiring substrate or an IC substrate.

The controlling unit 24 includes the processor 48, the gain controlling unit 50, the setting value storage memory unit 52, and the program memory unit 54.

The circuit substrate 76 according to the sixth embodiment is also used with being mounted on the portable telephone terminal device 2 for suppressing the echo component in the transmission voice T to enhance intelligibility of the received voice to the other party and to contribute to quality improvement of the two-way call.

The controlling unit 24 may be disposed outside the circuit substrate 76 and may be configured by a computer of the portable telephone terminal device 2 having the circuit substrate 76 mounted thereon.

Although the circuit substrate 76 is mounted on the portable telephone terminal device 2 in this embodiment, the circuit substrate 76 may be mounted on other electronic devices to achieve the communication function in those electronic devices.

Other Embodiments (1) Although the setting is performed by the one operation input unit 44 (FIGS. 4 and 7), the variable resistance 70, and the gain changeover switch 72 (FIG. 8), which are a switching unit that gradually switches the level of the received voice and/or the suppression level of the transmission voice in the above embodiments, a plurality of switching units may be included to separately set the gain setting value and the echo suppression amount in a discontinuous or continuous manner. Although the configuration can be simplified when the single switching unit is used for the setting and the switching, the gain and the suppression amount can be set through separate operations if the separate switching units are included.

Figure 11:
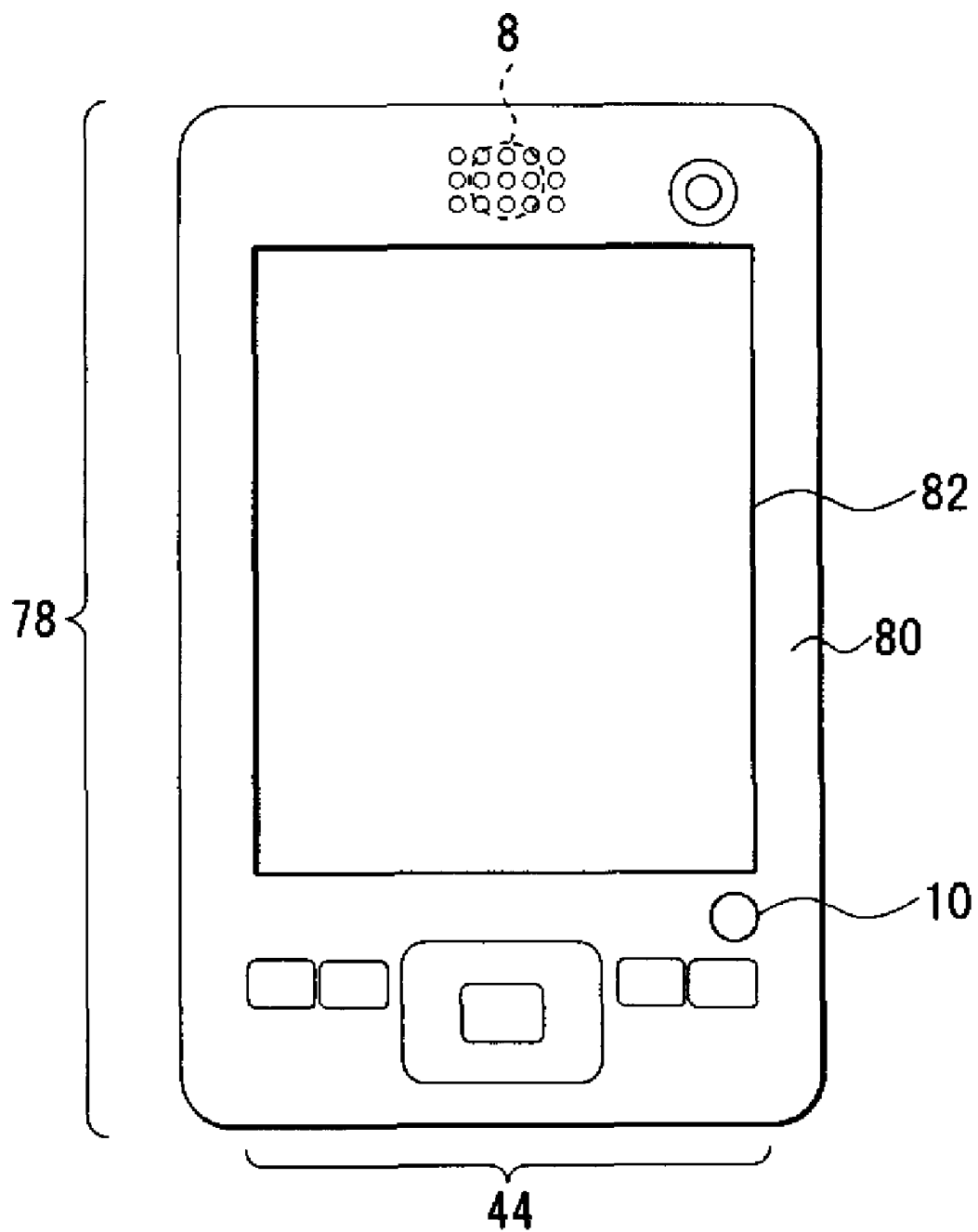
FIG. 11 depicts a PDA according to another embodiment.

(2) Although the portable telephone terminal device 2 is illustrated as an electronic device including a communication function in the description of the above embodiments, the present invention is applicable to a personal digital assistant (PDA) 78 as shown in FIG. 11. In FIG. 11, the same reference numerals are added to the portions in common with the portable telephone terminal device 2 of FIGS. 1 and 2.

In this case, a housing 80 of the PDA 78 is disposed with the speaker 8, the microphone 10, the operation input unit 44, and a displaying unit 82. Even in the case of the PDA 78 having both the speaker 8 and the microphone 10 disposed on the housing 80, the echo component of the transmitted voice can be suppressed to contribute to quality improvement of the two-way call.

Figure 12:
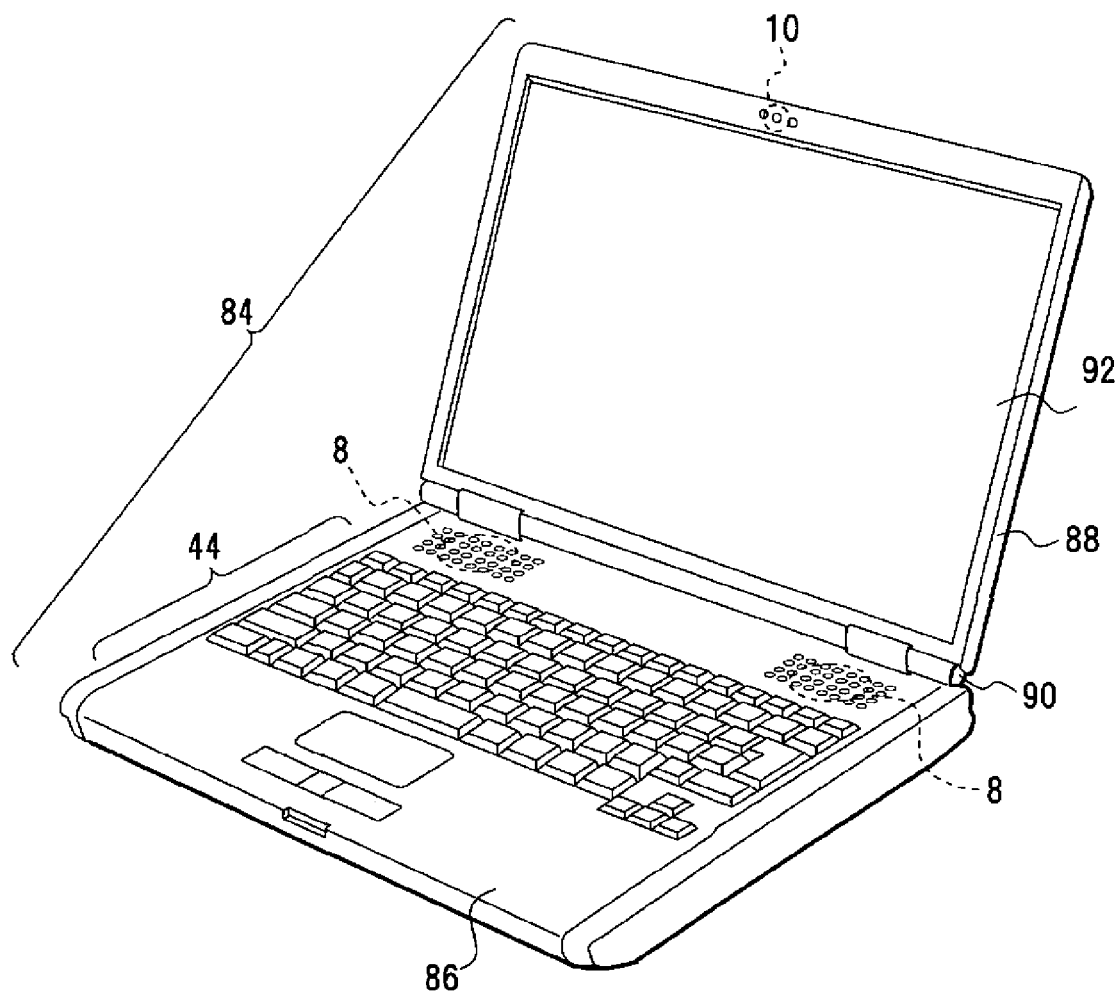
FIG. 12 depicts a PC according to another embodiment.

(3) The present invention is applicable to a personal computer (PC) 84 as shown in FIG. 12. In FIG. 12, the same reference numerals are added to the portions in common with the portable telephone terminal device 2 of FIGS. 1 and 2.

In this case, PC 84 is configured in an openable/closable manner by coupling the housings 86, 88 with a hinge unit 90; the housing 86 is disposed with the speaker 8 and the operation input unit 44; and the housing 88 is disposed with the microphone 10 and a displaying unit 92.

Even in the case of the PC 84 having the mechanically coupled housings 86 and 88, the echo component of the transmitted voice can be suppressed to contribute to quality improvement of the two-way call.

(4) The present invention is applicable to other electronic devices such as game machines and cameras having a communication function.

Although the most preferable embodiments of the present invention have been described, the present invention is not limited to the above description and may be modified and altered by those skilled in the art based on the gist of the present invention described in claims or disclosed in the description of course, and it is needless to say that such, modifications and alterations fall within the scope of the present invention.

According to the present invention, in an electronic device such as a portable telephone terminal device that can output received voice and input transmitted voice at the same time, since the echo component sneaking into the transmitted voice is suppressed and the echo suppression amount is controlled in accordance with the received voice level, highly accurate echo suppression, quality improvement of the two-way call, etc., can be achieved, and therefore, the present invention is highly useful.

What is claimed is:

1. An electronic device outputting received voice from a voice output unit and inputting transmitted voice through a voice input unit, comprising:
   a level adjusting unit that receives an input signal, and adjusts a level of volume of the received voice by adjusting a level of the input signal according to a gain setting value;
   an echo canceller unit that receives the input signal, generates a pseudo echo signal for the received voice in response to the input signal, and subtracts the pseudo echo signal from the transmitted voice to suppress an echo component in the transmitted voice;
   a memory unit that stores the gain setting value and an echo suppression amount which corresponds to the gain setting value and is an amount of suppressing the echo component by the echo canceller; and
   a controlling unit that changes the echo suppression amount in accordance with an adjusted amount of the level of volume by the level adjusting unit, and changes an amount subtracted from the transmitted voice in accordance with the echo suppression amount.

2. The electronic device of claim 1, wherein
   the echo canceller unit includes
      a pseudo echo signal generating unit that generates the pseudo echo signal, and
      a suppressing unit that subtracts the pseudo echo signal generated by the pseudo echo signal generating unit from the transmitted voice to suppress the echo component in the transmitted voice.

3. The electronic device of claim 2, further comprising:
   a determining unit that determines whether the received voice exists, the electronic device causing the suppressing unit to execute the suppression operation if the received voice exists.

4. The electronic device of claim 2, wherein the controlling unit sets the echo suppression amount in accordance with a setting value set in the level adjusting unit.

5. The electronic device of claim 2, wherein the controlling unit includes a processor that controls the echo suppression amount based on the adjusted amount of the level of volume.

6. The electronic device of claim 1, further comprising:
   a switching unit that gradually switches a level of the received voice and/or a suppression level of the transmitted voice.

7. The electronic device of claim 6, wherein the switching unit is a mechanical switch.

8. An echo canceling method of an electronic device outputting received voice from a voice output unit and inputting transmitted voice through a voice input unit, the method comprising:
   receiving an input signal, and adjusting a level of volume of the received voice by adjusting a level of the input signal according to a gain setting value;
   storing the gain setting value in a memory unit;
   receiving the input signal, generating a pseudo echo signal for the received voice in response to the input signal, and subtracting the pseudo echo signal from the transmitted voice to suppress an echo component in the transmitted voice; and
   changing an echo suppression amount which corresponds to the gain setting value, is an amount of suppressing the echo component, and is stored in the memory unit, in accordance with an adjusted amount of the level of volume, and changing an amount subtracted from the transmitted voice in accordance with the echo suppression amount.

9. The echo canceling method of an electronic device of claim 8, further comprising:
   determining whether the received voice exists; and
   suppressing the transmitted voice if the received voice exists.

10. The echo canceling method of an electronic device of claim 8, further comprising:
    setting the echo suppression amount in accordance with the level of the received voice volume.

11. The echo canceling method of an electronic device of claim 8, further comprising:
    gradually switching a level of the received voice and/or a suppression level of the transmitted voice.

12. A non-transitory computer readable medium having stored thereon an echo canceling program of an electronic device, the program being operable to drive a computer to execute:
    receiving an input signal, and adjusting a level of volume of a received voice by adjusting a level of the input signal according to a gain setting value;
    storing the gain setting value in a memory unit;
    receiving the input signal, generating a pseudo echo signal for the received voice in response to the input signal, and subtracting the pseudo echo signal from a transmitted voice to suppress an echo component in the transmitted voice; and
    changing an echo suppression amount which corresponds to the gain setting value, is an amount of suppressing the echo component, and is stored in the memory unit, in accordance with an adjusted amount of the level of volume, and changing an amount subtracted from the transmitted voice in accordance with the echo suppression amount.

13. The non-transitory computer readable medium storing an echo canceling program of an electronic device of claim 12, the program being operable to drive a computer to execute:
   determining whether a received voice exists; and
   suppressing the transmitted voice if the received voice exists.

14. The non-transitory computer readable medium storing an echo canceling program of an electronic device of claim 12, the program being operable to drive a computer to execute:
   setting the echo suppression amount in accordance with the level of the received voice volume.

15. The non-transitory computer readable medium storing an echo canceling program of an electronic device of claim 12, the program being operable to drive a computer to execute:
   gradually switching a level of the received voice and/or a suppression level of the transmitted voice.

16. A circuit substrate for use in an electronic device outputting received voice from a voice output unit and inputting transmitted voice through a voice input unit, comprising:
   a level adjusting unit that receives an input signal, and adjusts a level of volume of the received voice by adjusting a level of the input signal according to a gain setting value;
   an echo canceller unit that receives the input signal, generates a pseudo echo signal for the received voice in response to the input signal, and subtracts the pseudo echo signal from the transmitted voice to suppress an echo component in the transmitted voice;
   a memory unit that stores the gain setting value and an echo suppression amount which corresponds to the gain setting value and is an amount of suppressing the echo component by the echo canceller; and
   a controlling unit that changes the echo suppression amount in accordance with an adjusted amount of the level of volume by the level adjusting unit, and changes an amount subtracted from the transmitted voice in accordance with the echo suppression amount.

17. The circuit substrate of claim 16, wherein
   the echo canceller unit includes
      a pseudo echo signal generating unit that generates the pseudo echo signal, and
      a suppressing unit that subtracts the pseudo echo signal generated by the pseudo echo signal generating unit from the transmitted voice to suppress the echo component in the transmitted voice.

18. The circuit substrate of claim 17, further comprising:
   a determining unit that determines whether the received voice exists, the circuit substrate causing the suppressing unit to execute the suppression operation if the received voice exists.

19. The circuit substrate of claim 17, wherein
   the controlling unit sets the echo suppression amount in accordance with a setting value set in the level adjusting unit.

20. The circuit substrate of claim 17, wherein
   the controlling unit includes a processor that controls the echo suppression amount based on the adjusted amount of the level of volume.

21. The circuit substrate of claim 16, further comprising:
   a switching unit that gradually switches a level of the received voice and/or a suppression level of the transmitted voice.

22. The circuit substrate of claim 21, wherein the switching unit is a mechanical switch.

23. A portable telephone terminal device outputting received voice from a voice output unit and inputting transmitted voice through a voice input unit, comprising:
   a level adjusting unit that receives an input signal, and adjusts a level of volume of the received voice by adjusting a level of the input signal according to a gain setting value;
   an echo canceller unit that receives the input signal, generates a pseudo echo signal for the received voice in response to the input signal, and subtracts the pseudo echo signal from the transmitted voice to suppress an echo component in the transmitted voice;
   a memory unit that stores the gain setting value and an echo suppression amount which corresponds to the gain setting value and is an amount of suppressing the echo component by the echo canceller; and
   a controlling unit that changes the echo suppression amount in accordance with an adjusted amount of the level of volume by the level adjusting unit, and changes an amount subtracted from the transmitted voice in accordance with the echo suppression amount.

24. The portable telephone terminal device of claim 23, wherein
   the echo canceller unit includes
      a pseudo echo signal generating unit that generates the pseudo echo signal, and
      a suppressing unit that subtracts the pseudo echo signal generated by the pseudo echo signal generating unit from the transmitted voice to suppress the echo component in the transmitted voice.

25. The portable telephone terminal device of claim 24, further comprising:
   a determining unit that determines whether the received voice exists, the portable telephone terminal causing the suppressing unit to execute the suppression operation if the received voice exists.

26. The portable telephone terminal device of claim 24, wherein
   the controlling unit sets the echo suppression amount in accordance with a setting value set in the level adjusting unit.

27. The portable telephone terminal device of claim 24, wherein
   the controlling unit includes a processor that controls the echo suppression amount based on the adjusted amount of the level of volume.

* * * * *